United States Patent

[11] 3,604,998

[72] Inventors Thomas P. Haught
Stuarts Draft;
James W. Stugart, Waynesboro, both of, Va.
[21] Appl. No. 786,671
[22] Filed Dec. 24, 1968
[45] Patented Sept. 14, 1971
[73] Assignee General Electric Company

[54] DUAL DRIVE SERVO-CONTROLLED THREAD CUTTER INCLUDING MODE ENGAGEMENT FEATURES
7 Claims, 5 Drawing Figs.
[52] U.S. Cl. .................................................. 318/591,
318/571, 318/594, 318/598
[51] Int. Cl. ...................................................... G05b 7/00
[50] Field of Search ........................................... 318/571,
591, 594, 597, 598

[56] References Cited
UNITED STATES PATENTS
2,913,146 11/1959 Dickerson .................... 318/(20.245 X)
2,964,252 12/1960 Rosenberg .................... 318/(20.110 X)
3,156,438 11/1964 Diller et al. ................... 318/(20.245 X)
3,223,830 12/1965 Evans .......................... 318/(20.260 X)
3,246,218 4/1966 Centner et al. ............. 3.18/(20.286 UX)
3,475,998 11/1969 Steiner et al. .............. 3.18/(20.285 UX)

Primary Examiner—T. E. Lynch
Attorneys—Frank L. Neuhauser, Oscar B. Waddell, William S. Wolfe, Gerald R. Woods and Joseph B. Forman ABSTRACT: A controlled machine-positioning system wherein machine movement may be determined by separate drive sources, one of which is servo-controlled and directly responsive to input data, and the other being only indirectly controlled. This system is particularly useful as incorporated in numerically controlled arrangements for certain unique threadcutting operations and wherein the normal servocontrol is not wanted for a particular operating mode.

INVENTOR.
THOMAS P. HAUGHT
JAMES W. STUGART
BY Michael Masnik
THEIR ATTORNEY

INVENTOR.
THOMAS P. HAUGHT
JAMES W. STUGART
BY Michael Masnik
THEIR ATTORNEY

INVENTOR.
THOMAS P. HAUGHT
JAMES W. STUGART
BY
Michael Masnik
THEIR ATTORNEY

DUAL DRIVE SERVO-CONTROLLED THREAD CUTTER INCLUDING MODE ENGAGEMENT FEATURES

FIELD OF THE INVENTION

This invention concerns automatic machine control systems wherein the machine is controlled to perform a variety of operations in accordance with the instructions provided in a previously prepared program.

DESCRIPTION OF THE PRIOR ART

It is now well known to automatically control machines under the direction of a prearranged program to select particular tools and operate at particular speeds over particular paths. Typically, the program is supplied to the control system in numerical form on punched tape, magnetic tape, or punched cards. This numerical input data is routed to appropriate subsystems of the control system which function to develop the necessary signals to control the required machine movements.

One such automatic control system is the "Numerical Contouring Control" disclosed, for example, in U.S. Pat. No. 3,173,001, which was granted to John T. Evans on Mar. 9, 1965, and was assigned to the General Electric Company. In this system, the velocity of a machine tool relative to a workpiece and the path length or distance of movement of the tool are represented by a train of electrical pulses. Each pulse of the train corresponds to a discrete increment of movement and accordingly, the pulse repetition rate defines the velocity of movement.

In the operation of the control system disclosed in the cited patent, the path length and velocity commands are represented by the phase and rate of change of phase, respectively, of a pulse train applied to a servomechanism which in turn is coupled to and drives the machine tool. A sensing mechanism monitors the position of the machine tool as it responds to the command signals and generates a pulse train whose phase relative to a reference is representative of the actual position of the machine tool. The phase of the command position signal is compared with the phase of the actual position signal so that an error signal directly proportional to the phase difference may be generated to provide feedback control in the feedback loop of the servomechanism. The magnitude of the error signal and its sense or polarity (determined by whether the phase of the command signal leads or lags that of the actual position signal) causes the machine tool to move in such a direction as to tend to reduce the magnitude of the error signal.

The aforedescribed control system can be utilized for controlling a wide diversity of machines. The present invention is concerned with operations wherein it is desired to temporarily transfer control over a particular axis of motion from the usual command signals to another control source. This type of operation leads to a number of unique problems because the normal control operations include an interrelationship between the command-signal-generating units and the position feedback units. If the usual command-signal-generating units are separated from the control over a particular axis of motion, the actual position of the machine tool (and, of course, the actual position signal representative thereof) will differ greatly from the previous command position. When control is subsequently resumed, the control circuitry will have lost the required known relationship between command position and actual position. This would make it impossible to include within a sequential program an operation wherein it is desirable to remove control over a particular axis of motion from the usual command units.

One particularly advantageous operation of the type referred to concerns the threading of a workpiece. Although there are several ways to thread workpieces with both taps and dies which can be controlled within the conventional confines of existing numerical control systems, the one disclosed hereinafter in connection with a preferred embodiment of the invention requires that the spindle drive of a tapping unit be directly coupled to control the machine tool axis which governs the relative positions of the tape and workpiece. In order to do this, the usual servocontrol over this machine tool axis must be removed.

Since the invention contemplates both a unique machine tool control system and a novel threading system, it is worthwhile to note the existing types of threading using automatically controlled machine tools.

The most straightforward type of threadcutting is known as single-point threadcutting. This type of system is usually associated with lathes wherein the workpiece rotates against a single-point tool that removes material. The thread lead may be controlled by an encoder on the spindle which feeds pulses to a servo-controlled axis. It has been found that the inherent servo-velocity error or lag may affect the accuracy of the thread with this type of threadcutting. In addition, one is limited in the type of thread cut with the single tool. U.S. Pat. 3,174,367 granted to G. B. Lukens, II, on Mar. 23, 1965, and assigned to the General Electric Company illustrates this type of threadcutting arrangement as applied to automatic control apparatus of the type discussed above.

Another type of threadcutting is the floating tap or die threading method. This method requires that the tap or die be programmed at a speed corresponding to the product of the spindle speed and the lead. The spindle drive is independent of the feed drive and a floating arrangement on the toolholder is required to allow for variations between the feed speed produced and the actual feed required as determined by the spindle speed and the lead of the tap or die. The floating toolholder arrangement is quite expensive and it can be inefficient. Its usefulness is generally limited by thread length, spindle speed regulation and programming accuracy.

SUMMARY OF THE INVENTION

The present invention relates primarily to automatic machine tool control systems wherein movement of an object is controlled by separate drive means, and more particularly, wherein one drive means includes a servocontrol loop and the other does not.

A general object of the invention is to provide an improved machine control system.

Another object of the invention is to provide an improved machine control system which will permit the programming of operations that separate control over axis motion from the usual servo loop without disrupting subsequently programmed operations.

Another object of the invention is to provide an improved machine control system wherein machine tool motion is normally controlled responsive to command signals supplied to a servo loop and which permits the independent control of said machine tool motion while modifying said command signals to reflect the actual position of the machine tool.

Still another object of the invention is to provide an improved machine control system when motion along at least one axis is controlled independently of the usual position command signal, yet is still limited in extent by the input data.

Another object of the invention is to provide an improved machine control system for controlling the relative movement of two objects by separate drive means, one of the drive means being operable to control movement of both objects, if desired.

Still another object of the invention is to provide an improved machine control system capable of being programmed for a threadcutting operation wherein the relative axial motion between the threadcutting tool and the workpiece is mechanically synchronized to the relative rotational motion of the elements.

In accordance with one aspect of the invention, a system is provided for controlling the movement of an object by separate drive means. The system includes a first drive means operable to move the object and feedback means monitoring the movement. A command means develops command signals in accordance with input data that are representative of the desired movement of the object, and control means respond to these command signals and an output from the feedback means to control the first drive means. A second drive means is provided along with means for rendering either the first or second drive means operative. Finally, the system comprises means for controlling the command means to modify the command signals in accordance with the output of the feedback means when the second drive means is operative.

In accordance with another aspect of the invention, there is provided a system for controlling the relative movement of two objects. The system comprises first and second means operable to effect the motion of first and second objects, respectively; first and second drive means individually operative to cause movement of said objects through said first and second means, respectively; and, means for decoupling said first drive means and coupling said second drive means through said first means to cause synchronized movement of both objects.

The invention, and its numerous objects and features, may be more fully appreciated from the following detailed description which is made in conjunction with the drawings.

BRIEF DESCRIPTION OF THE DRAWINGS

FIG. 2 is a logic diagram of the Threading Initiate and Spindle Creep Control circuitry of an illustrative embodiment of the invention;

FIG. 3 is a logic diagram showing the Z-axis Phase Discriminator and control elements in the servo loop of an illustrative embodiment of the invention;

FIG. 4 is a logic diagram showing the Threaded Position Circuitry and Threading Control Feedback Switching of an illustrative embodiment of the invention; and FIG. 5 is a logic diagram showing control over the Command Phase Counter and Distance Counter in accordance with an illustrative embodiment of the invention.

DESCRIPTION OF THE PREFERRED EMBODIMENT

General Description

Figure 1:
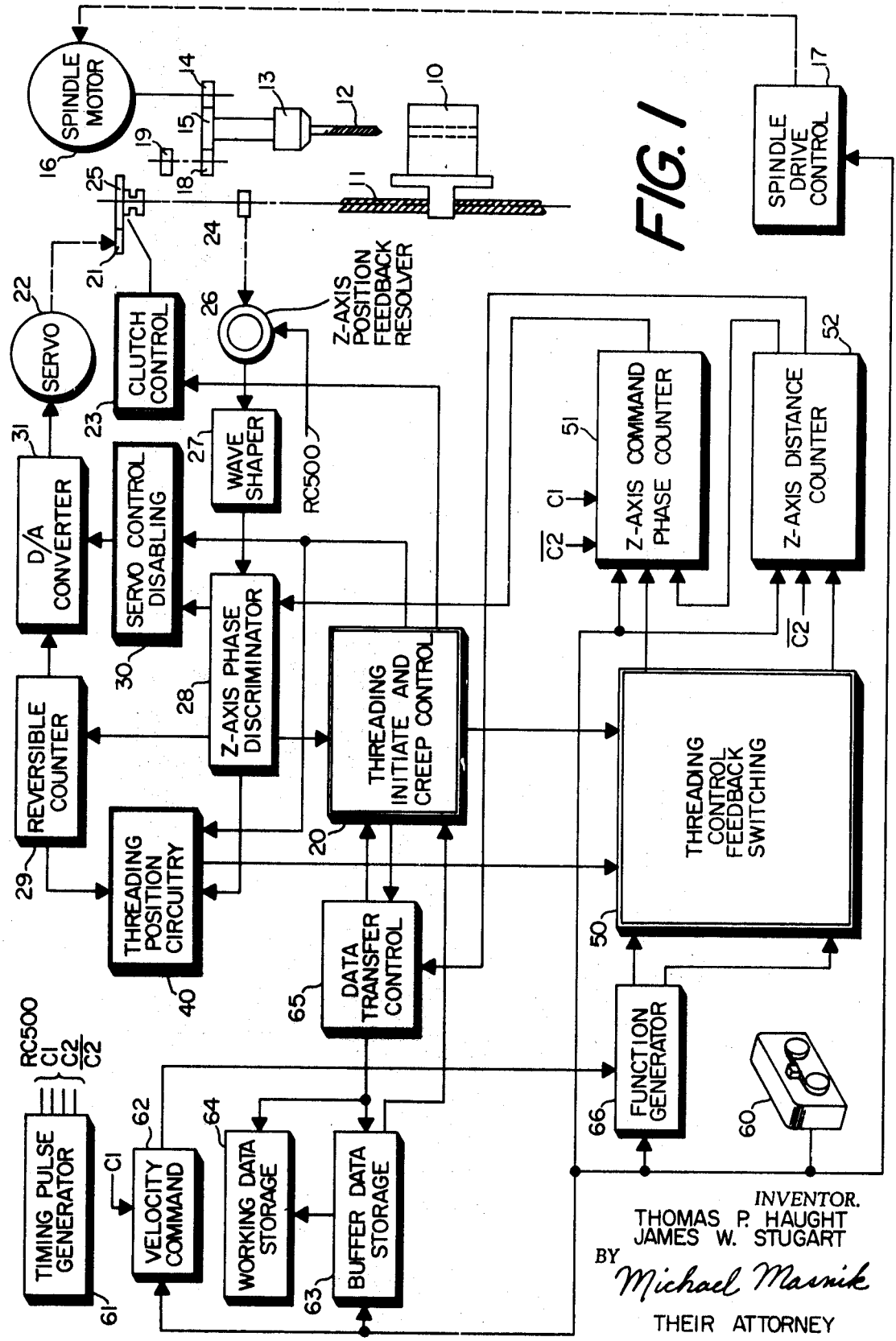
FIG. 1 is a block diagram of a numerical control system incorporating the features of the present invention as applied to a preferred embodiment wherein a threadcutting operation is performed.

The block diagram of FIG. 1 shows a numerical contouring control system of the type disclosed, for example, in the aforecited U.S. Pat. No. 3,173,001, including the modifications of the present invention. The disclosure of that patent described the components and functioning of a numerical contouring control system in great detail. To avoid repetition and to prevent obfuscation of the unique elements of the present invention, it will be assumed that the components and functioning of this type of control system are understood. Accordingly, only the new components of the present invention are explained in detail hereinafter. The most salient of these new components appear as double-lined blocks in FIG. 1. The single-lined blocks have counterparts in the cited patent.

It is noted that the cited patent describes the functioning of a numerical contouring control system with respect to two controlled axes. The present invention assumes the use of a third controlled axis, which will be referred to as the Z-axis. It should be understood that the control elements involved in developing appropriate control and feedback signals for the Z-axis are substantially identical to those described in connection with the Y-axis in the cited patent.

The system illustrated in FIG. 1 has been shown as operative to control movement of a tap 12 in spindle 13, relative to a workpiece 10. Spindle 13 is driven via gears 14 and 15. Workpiece 10 is mounted for movement along the Z-axis of the machine tool in accordance with the rotation of feed screw 11. A gear 25, which is part of a clutch mechanism, is fixed to feed screw 11 and this gear is driven by either a gear 21 or a gear 19 depending upon the particular operations being performed by the machine tool. During usual numerical control operations, feed screw 11 (and hence Z-axis motion) is driven by servomotor 22 via gear 21. During threading operations, feed screw 11 is driven by spindle motor 16 via gears 14, 15, 18, and 19. Gears 19, 21 and 25 are part of a clutch mechanism that functions under clutch control 23 to transfer the drive as desired. Under both drive conditions, a resolver 26 is connected to feed screw 11 by a pickoff means 24 and produces an output discretely indicative of the position of the workpiece on that axis. The resolver output is a feedback signal that is coupled via wave shaper 27 into a phase discriminator 28 where it can be compared with the command position signal established by the input data. Of course, the specific arrangement of elements is illustrative only and any equivalent arrangement may be used, including such things as translation of the spindle rather than workpiece 10.

It will be appreciated that the basic arrangement provides for mechanically disengaging the threading axis from the numerically controlled servo drive and connecting it to the spindle drive. The movement of workpiece 10 along the threading axis is thus a function of spindle rotation and the thread lead, i.e., the unit movement of the workpiece per revolution of the spindle, is established by the gear ratio involved.

A key feature of the invention relates to the provision of means for utilizing the feedback data from resolver 26 and the continuous monitoring of movement along the Z-axis while under spindle drive so that the depth (penetration) and retraction of the tap 12 can be programmed and controlled and so that the system can be programmed into and out of a "Threading Mode" of operation without losing synchronization with the usual controlled operations. The details of how this is accomplished will be developed as this description proceeds. First, a general review of the operation of the control system will be given.

Under general operating conditions, the phase discriminator 28 compares the actual position signal from wave shaper 27 with the command position signal from command phase counter 51, and any difference in phase between the command positional signal and the actual position signal represents the difference between the command position and actual position. This difference is used via reversible counter 29 and digital-to-analog converter 31 to produce an error signal which operates servomotor 22 to drive the Z-axis until the error is reduced to zero by bringing the actual position into coincidence with the command position.

The control portion of the described system includes numerical input data equipment 60 which accepts the numerical command information. Input data equipment 60 reads the instructions and addresses on the input tape, for example, and generates appropriate electrical signals for controlling the machine tool. The instructions from the input data equipment 60 are coupled to various elements or portions of the control system in accordance with the programmed addresses. Two such destinations are velocity command 62 and buffer data storage 63. The latter unit preliminarily stores the next operation command while its predecessor is controlling machine operations.

As a synchronizing source, and as basic carrier for transporting signals throughout the control unit, the system employs pulse train generator 61. This clock pulse generator provides pulses at a basic rate of, for example, 250 kilocycles or fractions thereof to the various control counters, the feedback resolver 26 and elsewhere throughout the system.

Velocity command 62 is one recipient of the clock pulses. This unit is operative to vary the rate of pulses produced at its output as indicated or called for by the input data to provide a pulse train having a repetition rate commensurate with the desired velocity of machine movement.

When performing typical numerical contouring operations, the function generator 66 resolves the pulses received from velocity command 62 into one or more components indicative of the movement the machine tool is to make along the desired axes of motion. Function generator 66 makes this resolution of the received signals in accordance with command information from input data equipment 60. FIG. 1 shows units for controlling Z-axis motion only, but as fully explained in cited U.S. Pat. No. 3,173,001, all other axes may be similarly controlled.

A Z-axis distance counter 52 and a Z-axis command phase counter 51 are supplied with the pulses from function generator 66 via a threading control feedback switching circuitry 50. During normal contouring control operations, the threading control feedback switching circuitry, which is primarily a gating circuit, establishes connections between function generator 66 and the command and distance counters 51, 52 that are substantially identical to those established in the contouring control system disclosed in cited U.S. Pat. No. 3,173,001. Distance counter 52 counts the pulses supplied thereto and when the number of pulses has been counted for the command distance of movement, it prevents further operation of command phase counter 51. Until this time, command phase counter 51 supplies a phase-controlled command position signal to phase discriminator 28.

As disclosed in detail in cited U.S. Pat. No. 3,173,001, for contouring control, command phase counter 51 is supplied with command information from input data equipment 60 and with pulses from timing pulse generator 61. If no pulses are supplied to the command phase counter from the function generator 66, command phase counter 51 provides an output which has the same pulse rate as that of feedback resolver 26. However, if pulses are supplied to the command phase counter from the function generator, these pulses are counted. If the direction of movement called for is in a positive direction, the counted pulses are added to the clock pulses; but, if the direction of movement is in the negative direction, the counted pulses are subtracted from the clock pulses. The addition or subtraction of pulses by command phase counter 51 has the effect of advancing or retarding the phase of the output pulses in the command position signal produced thereby. This advanced or retarded phase condition is then compared in discriminator 28 with the phase of the actual position signal from wave shaper 27 and an error signal is generated indicative of the relative phases. Servomotor 22 is driven in accordance with this error signal and causes proper motion along the Z-axis to eliminate it.

With a general understanding of the basic operation of the control system in order to effect numerical positioning or contouring control, it is now possible to appreciate the modifications that are made by the present invention in order to effect the cutting of threads. Generally speaking, the present invention provides means operative under a taped program input for automatically transferring the Z-axis drive from servomotor 22 to a direct gear drive from the spindle motor 15. For reasons of convenience, the invention is described in connection with a tapping operation. It is believed clear to those skilled in the art that the modes described hereinafter are equally applicable to other threading operations.

All program data is initially stored in buffer data storage 63 and thereafter it is transferred to working data storage from which the various control portions of the system are activated. When buffer data storage 63 registers data indicating a threading mode of operation, threading initiate and creep control circuitry 20 prepares the equipment so that it will be ready to operate when the program is presented to the working data storage. Since the required mechanical switching takes more time that the usual controlled functions, threading initiate and creep control circuit 20 first applies a signal to the data transfer control 65 to block transfer from the buffer data storage 63 to the working data storage 64 until the mechanical switching is effected. At the same time, it provides a signal to servocontrol disabling circuitry 30 to remove the discriminator 28 input to the digital-to-analog converter 31. In addition, threading initiate and creep control circuitry 20 provides the enabling signals to effect clutch operation and to place the system in the "Threading Mode" of operation.

In the "Threading Mode" of operation, threading position circuitry 40 connects discriminator 28 to command phase counter 51 and distance counter 52 via threading control feedback switching 50. This latter connection replaces the usual connection between the function generator 66 and the command phase and distance counters 51, 52. As a result of the new connections, the command phase counter 51 and distance counter 52 are supplied with signals representative of the difference between the command phase counter output and the actual position signal generated as a result of the independent drive of the Z-axis. Whereas in normal contouring operations the command position signal from command phase counter 51 is compared with the actual position signal to develop an error signal for controlling the servomotor 22; in the "Threading Mode," the signals are compared to develop an error signal for controlling the updating of the command phase counter 51 and the distance counter 52. In other words, under normal contouring operations, the actual position signal is indirectly changed to bring it into conformity with the command position signal, while under the "Threading Mode," the command position signal is changed to bring it into conformity with the actual position signal. This latter feature permits retention of the "Threading Mode" under the programmer's control because it enables him to program such things as the amount of Z-axis motion and also be sure that the command position and actual position are synchronized at the end of a threading operation.

A detailed description of the specific means for accomplishing the desired results is set forth hereinafter in conjunction with FIGS. 2–5.

DETAILED DESCRIPTION

In the logic diagrams making up FIGS. 2 through 5, it will be found that the elements are composed primarily of flip-flops and NOR logic gates. For convenience in understanding the functions of the various components, the flip-flops are assigned a two-part designation. In this designation, the numerical prefix represents the figure in which the element appears and the alphabetical suffix is a word or acronym descriptive of the function performed by the flip-flop. For example, flip-flop 4-ERROR appears in the FIG. 4 and is placed in a "set" state in order to indicate the existence of an error or difference between the command position signal and actual position signal. The leads and other elements also bear numerical prefixes indicative of the figure in which they originate; however, numerical suffixes are used in order to differentiate between the various elements in each figure.

Figure 2:
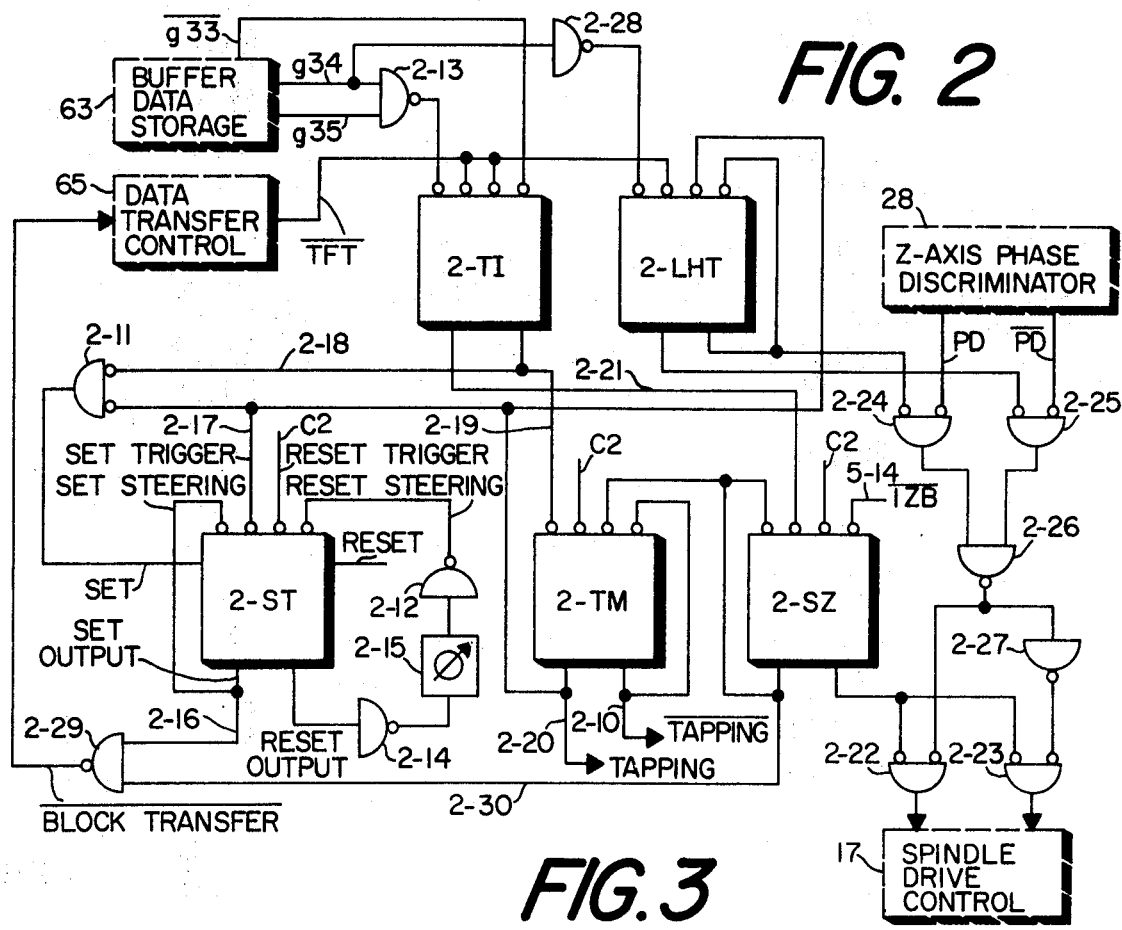
FIGS. 2–5 are logic diagrams of specific circuitry which may be employed to carry out the threadcutting operation described as an illustrative embodiment of the invention; more specifically.

As a further aid in understanding circuit operation and recognizing the leads over which important control signals are applied, functional lead designations are sometimes used in addition to the numerical designations. For example, lead 2–10 in the lower left quadrant of FIG. 2 is designated "-TAPPING." This indicates that the signal for initiating the "-Tapping Mode" is transmitted by this lead. The bar placed over the functional lead description indicates that the operative signal is a logic zero. The absence of such a bar indicates that the operative signal is a logic one.

The NOR logic gates used in this circuitry are of conventional design. The logic function NOR in Boolean algebra is well known and can be defined as follows for a two input gate: if one or both inputs have a logic one applied thereto, the output will assume a logic zero state. Stated another way, if neither one input nor the other input has the logic one applied thereto, the output will assume a logic one state. Two types of symbols have been used for illustrating the NOR gates. One of these symbols has small circles on the input leads (e.g., gate 2–11 at the left side of FIG. 2). This symbol is used where the desired operative output is a logic one. The other symbol has a small circle on the output lead (e.g., gate 2–12 associated with shift timer flip-flop 2–ST). This symbol is used where the desired operative output is a logic zero. Although the symbols are different, the gates may be physically the same and they both perform the same NOR operation.

The standard flip-flop used in the circuit diagram has the possibility of six input and two output terminals. The specific function of each terminal is shown, for example, in the illustration of typical flip-flop 2–ST appearing at the left side of FIG. 2. The application of a logic one to the Set input will place the flip-flop in a "set" state. Although not used on this element, an analogous Reset input is available. The application of a logic one signal to the Reset input will place the flip-flop in a "reset" state. When "set," the flip-flop provides a logic one at its Set output and a logic zero at its Reset output. The reverse is true of the "reset" state.

Generally, a flip-flop is operated by the application of triggering pulses to the trigger inputs. A trigger pulse is one which goes to a logic zero condition. Generally, these pulses are provided in a uniform train from the clock pulse generator, In response to a trigger pulse, a flip-flop assumes the state dictated by the signals on its Set steering and Reset steering inputs. The application of a logic zero to either steering lead will be effective to switch the flip-flop upon occurrence of the trigger pulse so that the corresponding output provides a logic one. If the corresponding output of the flip-flop is already at logic one, no change of state will occur. It will be noted that the steering leads have small circles thereon. This is consistent with the previously noted convention that such circles indicate that operative signals applied to these leads must be logic zero.

In keeping with the already noted symbol convention, the output leads of the flip-flop can be identified by their origin. Thus, the lead associated with the Set output of flip-flop 2–ST may be designated 2–ST and the lead associated with the Reset output may be designated $\overline{2-ST}$.

In cited U.S. Pat. No. 3,173,001, there is a description of a program manuscript that may be punched into a control tape for commanding a machine tool to carry out a series of operations. In keeping with the nomenclature established in that patent disclosure, the following discussion will employ program selection "g" codes to program the control system into and out of the tapping mode. Thus, the code "g33" will mean that the tapping mode should be cancelled, the code "g34" will mean a right-hand tapping operation, and the code "g35" will mean a left-hand tapping operation. Once the system has been programmed into the tapping mode, the Z-axis will be controlled by controlling the spindle speed. Program codes governing spindle operation will include "m03" to rotate the spindle in a forward direction, "m04" to rotate the spindle in a reverse direction, and "m05" to command the spindle to stop.

The sense or sign of the direction of Z-axis motion depends upon whether right-hand tapping or left-hand tapping has been programmed. Thus, for right-hand threading, spindle forward will cause negative axis motion and spindle reverse will cause position axis motion. Conversely, for left-hand threading, spindle forward will cause positive axis motion and spindle reverse will cause negative axis motion.

Once the system has been established in the tapping mode by use of the "g" codes, it is necessary to program the Z-axis departure which corresponds to the tapping depth or retraction. This is done in the standard manner by simply indicating the amount of departure as though the Z-axis were still being driven by the contouring servo drive. In addition to programming the departure, the proper spindle direction codes are required to cause the Z-axis to move in the correct direction. If desired, specific spindle speed codes may also be inserted into the program.

As the spindle 13 rotates, and the corresponding Z-axis movement occurs, the resolver 26 monitors the distance moved and via discriminator 28 counts down the Z-axis distance counter 52. When counter 52 registers zero, the departure has been completed and a new program will be read. This new program may be "m05," which would cause the spindle and Z-axis movement to stop. It may be "m04," causing the spindle to reverse and the Z-axis to retract. In this case, the new information should include under the Z address the desired retract, departure and direction. On the other hand, the new information may also be utilized to merely change the spindle speed while keeping the same direction; or if the Z-axis is already retracted, to position the tap to a new hole. The variety of program commands employed is generally limited only by the imagination of the programmer.

Attention is now directed toward FIG. 2 for consideration of the steps taken when the "Tapping Mode" is to be initiated. As noted previously, the program information from numerical data input 60 is first read into buffer data storage 63 and thereafter transferred to working data storage 64 when it is to be employed for controlling the system. When the program codes "g34" or "g35" appear in the buffer command storage unit, gate 2–13 on the upper left of FIG. 2 will provide a logic zero output to the Set steering input of tapping initiate flip-flop 2–TI. Subsequently, upon generation of the control signal $\overline{TFT}$ for transferring the program from the buffer data storage 63 into the working data storage 64, a trigger is applied to both triggering inputs of flip-flop 2–TI causing it to assume a "set" state. It will be appreciated that the detailed circuitry for reading out the information in buffer data storage 63 and for generating the required transfer time signal is conventional.

The setting of tapping initiate flip-flop 2–TI generates a logic zero at its Reset output that is applied over lead 2–18 to gate 2–11 wherein it is inverted and applied to the Set input of shift timer flip-flop 2–ST. Flip-flop 2–ST is immediately "set" and provides a logic one on lead 2–16 at its Set output. This logic one output is applied to the data transfer control 65 to block the transfer of the program data into the working data storage 64 until a sufficient period of time has elapsed to effect the necessary mechanical transfer of control over the Z-axis via the clutch mechanism. The timing is effected by means of a time delay unit 2–15 coupled between the Reset output and Reset steering input of the shift timer flip-flop. This is a reentrant connection including gate 2–14, time delay circuit 2–15 and gate 2–12 in series. Upon elapse of the desired predetermined period of time, e.g., 5 or 6 seconds, the logic zero Reset output is applied as a Reset steering signal and upon occurrence of the next C2 timing pulse, flip-flop 2–ST will reset. The "reset" condition places a logic zero on lead 2–16 thereby indicating that data transfer may take place. This logic zero signal also conditions the shift timer flip-flop so that in the event of a trigger pulse on lead 2–17 it will again assume a "set" state. This event will be considered hereinafter.

Reference has been made to timing signal C2. This is a pulse train or square having a frequency half that of the basic timing frequency generated by timing pulse generator 61. In this embodiment, it is considered that this signal will be provided from function generator 66 during "Tapping Mode" in place of the velocity controlled pulse trains normally supplied during contouring operations.

In addition to setting shift timer flip-flop 2–ST, the setting of tapping initiate flip-flop 2–TI is operative to apply a logic zero Set steering input via lead 2–19 to "Tapping Mode" flip-flop 2–TM. Thus, upon occurrence of the next C2 trigger pulse, "Tapping Mode" flip-flop 20TM is "set." The logic one TAPPING signal generated on lead 2–20 and the logic zero $\overline{TAPPING}$ signal generated on lead 2–10 are then used throughout the system to initiate the clutch operation and to initiate the various switching operations to permit monitoring of the Z-axis motion.

The "Tapping Mode" of operation is terminated when buffer data storage 63 receives program code g33. When this occurs, tapping initiate flip-flop 2–TI receives a logic zero on its Reset steering input and the next occurring transfer signal $\overline{TFT}$ will reset the flip-flop.

Figure 5:
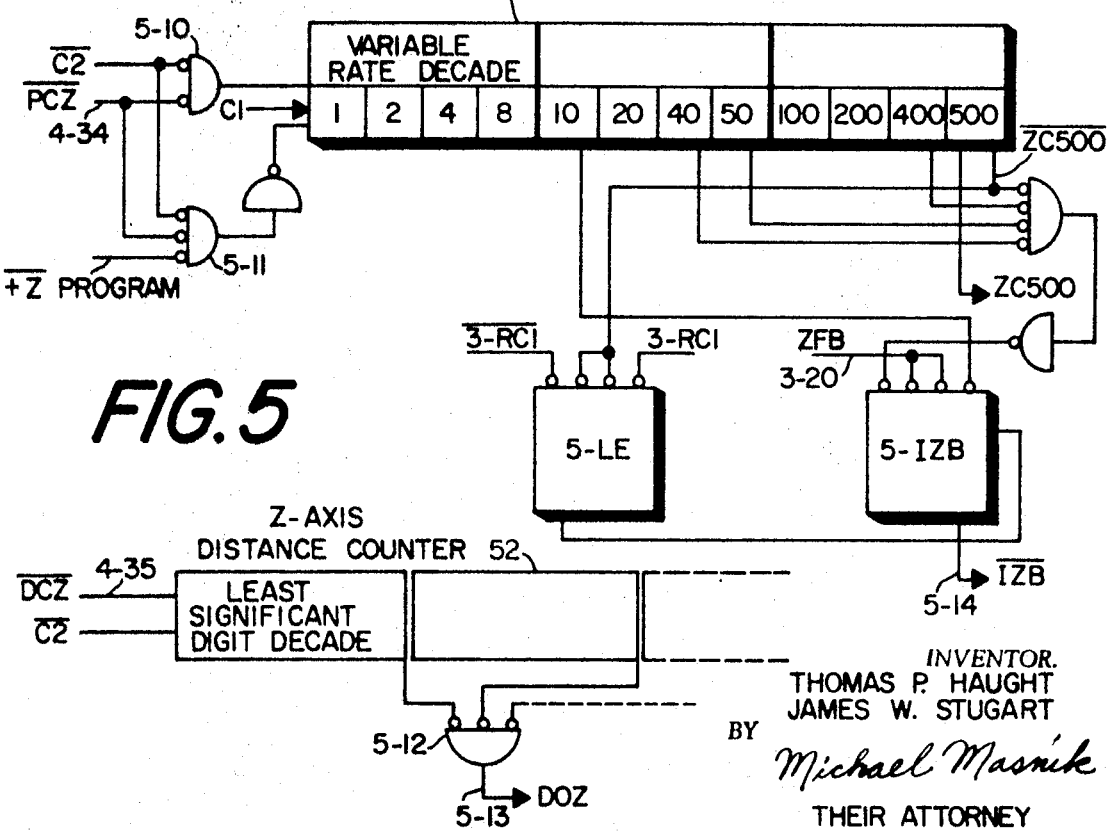

Before the control system can act upon a new program after having functioned in the "Tapping Mode," it is important that the actual machine position and command position be in coincidence. To insure this coincidence, there is provided a "zero band" within which the actual position signal must fall before the transfer of new program data may take place. In this embodiment, the zero band represents an area within ±0.001 inch of the command position. To establish this band, in zero band flip-flop 5-IZB is provided. This flip-flop is Set steered from the stages of the command phase counter that are set when 990 is registered. It is Reset steered when the stage registering 10 is set. The trigger for flip-flop 5-IZB is the actual position signal from wave shaper 27. Thus, flip-flop 5-IZB will be set if and only if the actual position is within the zero band. Once set, it is reset by large error flip-flop 5-LE when the first stage of the reversible counter is in a "set" state and the last stage of the command phase counter is set. This resetting represents the condition when the error between actual position and command position is less than 0.05 inch. The connections for flip-flops 5-IZB and 5-LE are shown in FIG. 5.

Returning now to FIG. 2, it will be recalled that tapping initiate flip-flop 2-TI is reset when the "Tapping Mode" is cancelled. This results in a logic zero signal on lead 2-21 that operates as a set trigger to start zero flip-flop 2-SZ. If the system is within the zero band, flip-flop 2-SZ will be residing in a reset state and will be set by the signal on lead 2-21; if not within the band, the flip-flop will remain set. Setting flip-flop 2-SZ will generate a logic one block transfer signal on lead 2-28 that is applied to the data transfer control 65.

Start zero flip-flop 2-SZ controls the operation of the spindle drive to bring the actual position and command position within the tolerable zero band. As noted above, when within this band, in zero band flip-flop 5-IZB is set and therefore a logic zero signal is applied from its Reset output to the Reset steering input of start zero flip-flop 2-SZ. The next appearing C2 trigger will switch the flip-flop to reset. On the other hand, with the actual position outside of the zero band, flip-flop 2-SZ will be in a "set" state and the resulting logic zero on its Reset output will enable gates 2-22 and 2-23 to pass signals to the spindle drive control 17 that will creep the spindle along at a low speed until the actual position and command position are within the zero band. Note, the details of spindle drive control are not germane to this invention and it is only necessary to indicate the type of action required and when it is required.

Figure 3:
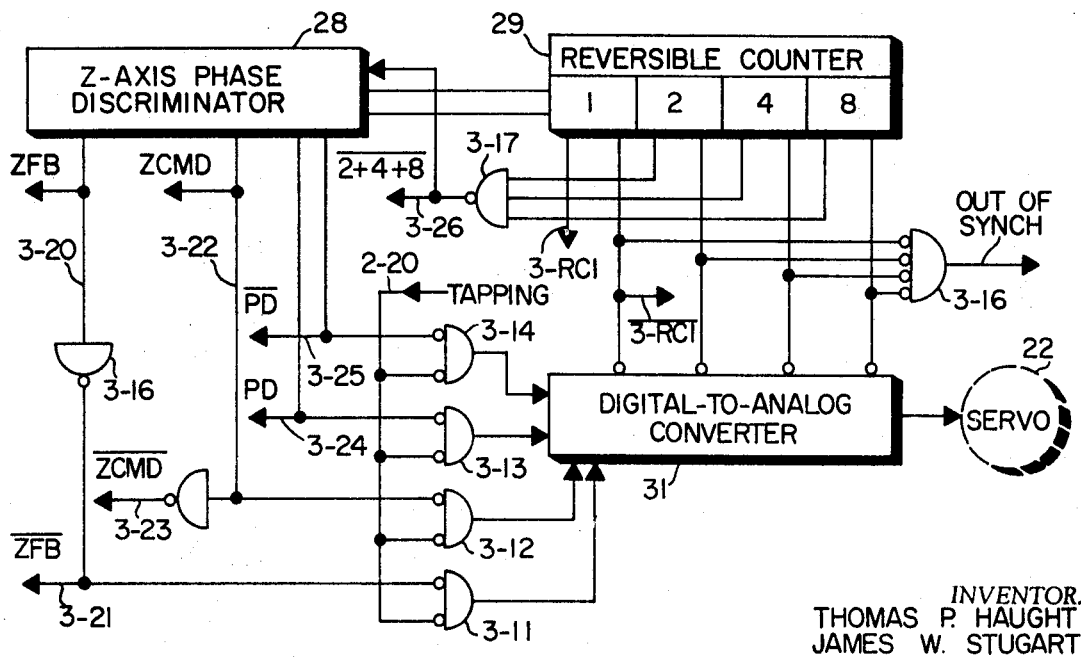

The direction in which the spindle must move to redress the error depends upon the sense or direction of the error, and that is available as information from the standard discriminator circuit 28. In FIG. 3 two outputs PD and $\overline{PD}$ are illustrated from the discriminator. These outputs are respectively at logic one or logic zero for a positive direction error. This direction information is applied via gates 2-24, 2-25, 2-26, 2-27, 2-22 and 2-23 to furnish a spindle creep signal in the proper direction.

In order to take into account the fact that the sense of Z-axis movement is coupled to the direction of spindle rotation and the fact that left-hand threads require opposite rotation, left-hand tap flip-flop 2-LHT is provided. This flip-flop is set when the next program in buffer data storage 63 is g34, or left-hand tapping, and the transfer signal is received.

The functioning of the gates 2-22 through 2-27 can be easily appreciated by consideration of a typical situation. Assume that the position error is positive and therefore signal PD is a logic one and signal $\overline{PD}$ is at logic zero. In the event that left-hand tapping is programmed for the next operation, left-hand tap flip-flop 2-LHT will be set. Thus, gates 2-24 and 2-25 will both provide logic zero outputs and these outputs will cause a logic one output from gate 2-26. If start zero flip-flop 2-SZ is set due to an excessive error, gates 2-22 and 2-23 will both have one input at logic zero. Accordingly, the logic one output of gate 2-26 will have no effect upon gate 2-22; however, it will affect gate 2-23 because it first passes through inversion at gate 2-23. Gate 2-23 therefore produces a logic one output indicating to the spindle drive control that the spindle should be crept in a reverse direction to remove the error.

In the event that the position error was negative rather than positive, the "set" condition of left-hand tap flip-flop 2-LHT would have produced a logic one output on gate 2-24 and a logic zero at the output of gate 2-26 which would have been operative to generate a logic one at the output of gate 2-22, thereby indicating need for forward creep of the spindle in order to eliminate the error. On the other hand, if right-hand tapping were on the next program, flip-flop 2-LHT would be in a "reset" state. In this case, a positive error would call for forward creep and a negative error would call for reverse creep.

With an understanding of how the "Tapping Mode" is initiated and the manner in which the equipment is brought into condition to receive subsequent programs, attention is now directed to FIG. 3 for a brief review of the specific discriminator circuitry which is instrumental in accomplishing the generation of necessary signals for practice of the present invention.

It will be recalled that whereas for contouring control, the output of the discriminator 28 drives digital-to-analog converter 31 which in turn controls servomotor 22 in order to control the Z-axis position, the "Tapping Mode" requires disconnection of the discriminator from the digital-to-analog converter in order to prevent the servocontrol and replace it with a mechanical linkage from the spindle motor 16. Inasmuch as the details of the discriminator and the digital-to-analog converter are not germane to the present invention, FIG. 3 simply illustrates the gating means that may be employed between the discriminator and the digital-to-analog converter in order to effect a disablement upon receipt of the tapping signal generated at the Set output of "Tapping Mode" flip-flop 2-TM on lead 2-20.

The three principal components in FIG. 3 are discriminator 28, reversible counter 29 and digital-to-analog converter 31. Each of these components and its operation is described in detail in cited U.S. Pat. No. 3,173,001. For the sake of simplicity, only those inputs and outputs important to the description of this invention have been shown.

Discriminator 28 provides a signal on lead 3-20 indicative of the actual position of the machine tool. This signal is designated ZFB (meaning Z-axis feedback). It also provides a signal on lead 3-21 indicative of the command position as dictated by the command phase counter. This signal is designated ZCMD (meaning Z-axis command position). In addition, the discriminator yields the error sense signals previously referred to in connection with FIG. 2.

Reversible counter 29 is shown as comprising four binary stages that are weighed 1, 2, 4 and 8. The interconnection of these stages to the digital-to-analog converter 31 and the manner in which several control signals are generated is shown. For the actual triggering of this counter and its relationship to the other components, the reader is directed to the previously mentioned patent. However, it is important to recognize that the converter 31 is provided with binary data from reversible counter 29 which represents the difference between command position and actual position. Its output is the analog equivalent of this binary data.

Digital-to-analog converter 31 receives four basic signals from discriminator 28. These are the actual position signal $\overline{ZFB}$, the command position signal ZCMD and the positive direction error signals PD and $\overline{PD}$. Each signal is applied through a gate 3—11, 3—12, 3—13, 3—14, respectively, which has as a second input the TAPING signal from "-Tapping Mode" flip-flop 2—TM. Whereas the signals from the discriminator usually pass through their respective gates, they are blocked during the "Tapping Mode." Thus, the digital-to-analog converter cannot furnish control to the servomotor during operation in the "Tapping Mode."

Before proceeding with consideration of system functioning, several outputs extracted from the reversible counter 29 should be noted. First, a gate 3-16 is shown connected to the Reset outputs of each stage. If one employs the conventions adopted in the previously cited patent, it will be appreciated that this gate produces a logic one signal only when the deviation between the command position and actual position exceeds 1.4 inches. This signal may be used to warn an operator that remedial steps appear to be required. Second, a gate 3-17 is shown connected to the Set outputs of stages 2, 4 and 8. When any of these stages are set, gate 3—17 provides a logic zero output designated $\overline{2+4+8}$ on lead 3—18. This signal is a logic one only if the position error is extremely small and is therefore represented by the condition of the first stage of the counter.

With an understanding of how Z-axis control is removed from the normal servo loop in order to enable control by means of the spindle motor and appropriate gearing, the manner in which the position of the machine tool is monitored and used to update the command phase counter and distance counter will be explained. In order to do this, attention is directed to FIGS. 4 and 5.

It will be recalled that the difference between the commanded position and actual position of the apparatus may be represented by the difference in phase between the feedback signal ZFB and the command position signal ZCMD, both of which are available from discriminator 28. In order to accomplish the necessary update counting of the command phase counter and distance counter, it is necessary to generate an error gate signal having a width commensurate with the phase difference between the ZFB and ZCMD signals. The appropriate circuitry for responding to these signals appears in FIG. 4. Another consideration in developing this error gate signal relates to the fact that a reversible counter such as the one used in conjunction with this contouring control circuitry has a first stage which will normally toggle or switch states even when there is no input thereto. Thus, the gate signal developing circuitry must take this into account so that it is reliable irrespective of whether or not the first stage of the reversible counter is in a "set" or "reset" condition.

Figure 4:
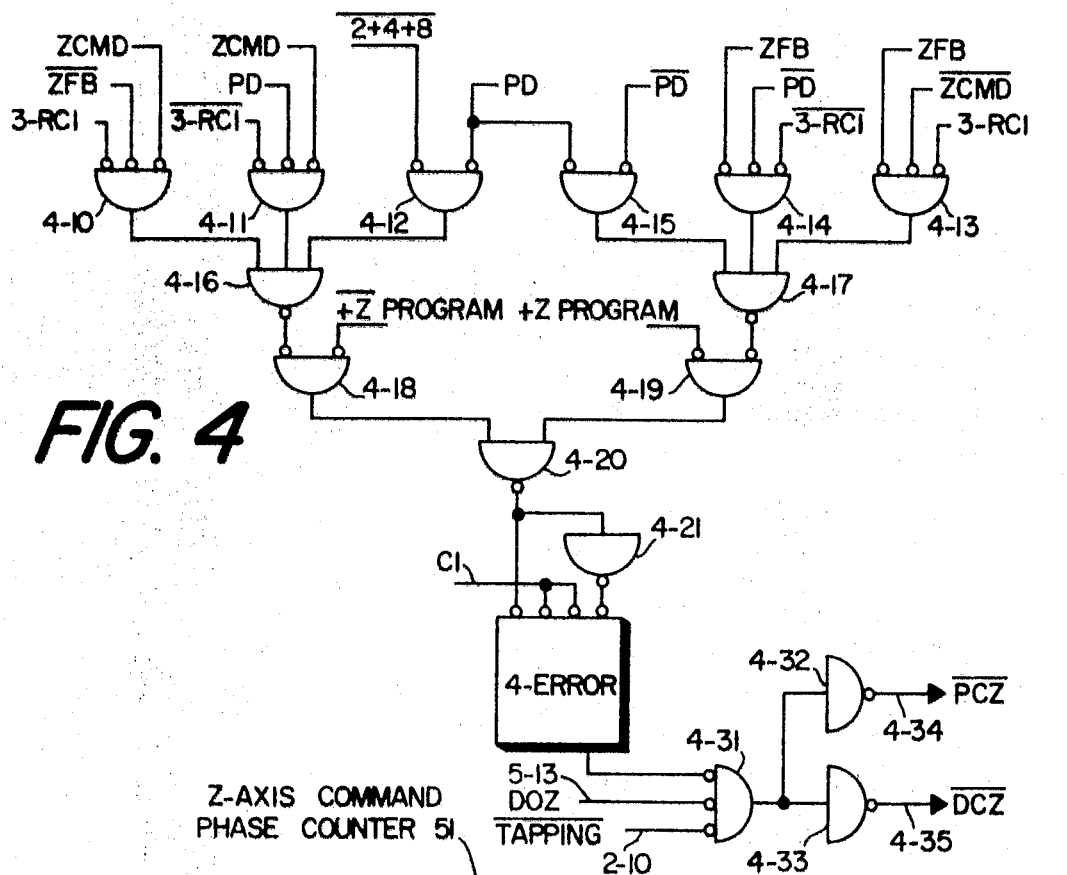

In FIG. 4, gate 4-10 has as inputs thereto the Set output of the first stage of reversible counter 29, the actual position feedback signal $\overline{ZFB}$ from the discriminator in FIG. 3, and command position signal ZCMD from the discriminator. With this input arrangement, assuming a positive direction of the Z-axis the actual position leading the command position and the first stage of reversible counter 29 being reset, gate 4-10 will provide a logic one output when $\overline{ZFB}$ goes to logic zero and this will continue until ZCMD goes to logic one. In other words, the logic one output of gate 4-10 normally exists for the duration of time between the actual and command positions. This logic one is applied through gates 4-16, 4-18 and 4-20, to the Set steering lead of error flip-flop 4-ERROR. It will be seen that the signal is passed by gate 4-18 when the direction of the Z-axis is programmed positive. With the Set steering lead experiencing a logic zero input, the next appearing basic timing pulse from generator 61 acts on the trigger input and sets the flip-flop. Error flip-flop 4-ERROR will remain set steered via the described gates until the ZCMD signal goes to logic one unless the reversible counter's first stage toggles to a "set" state.

In the event that the first stage of the reversible counter is toggled to a "set" state during the interval between receipt of the ZFB and ZCMD transition signals, gate 4-11 will provide a logic one output in order to maintain the Set steering upon flip-flop 4-ERROR. The inputs to gate 4-11 include the Reset output of the first stage of the reversible counter, the direction signal PD and the command position signal ZCMD. Thus, the logic one output of gate 4-11 occurs when the reversible counter is in a "set" state, the error is in a negative direction (i.e., actual position lead command position), and the command position signal ZCMD has not yet gone to logic one.

When the command position signal ZCMD goes to logic one, both gate 4-10 and gate 4-11 will produce logic zero outputs. Accordingly, gate 4-16 will provide a logic one output unless gate 4-12 is at logic one. This latter possibility will be investigated in a moment. Assuming that all inputs to gate 4-16 are at logic zero, the logic one output therefore forces gate 4-18 to a logic zero output and thereby removes the Set steering from flip-flop 4-ERROR.

This operation will only be modified in the event that the error is more than a complete cycle in magnitude (i.e., more than the period of a 250-cycle signal). This condition is established by gate 4-12. One input of gate 4-12 is always logic zero unless the reversible counter stages 2, 4, and 8 are all in the "reset" state. This input lead is designated $\overline{2+4+8}$. The other input is direction signal PD from the discriminator.

Gates 4-13, 4-14, 4-15, 4-17 and 4-19 operate in the fashion just described with respect to gates 4-10, 4-11, 4-12, 4-16 and 4-18. The difference in these gates is that they relate to operation when the command position signal leads the actual position signal and when the Z-axis is programmed negative.

To appreciate how the output of the gating circuits is used, consider the objectives to be attained. If the Z-axis is programmed positive, the Z-axis motion should be in a positive direction and thereby cause the actual position signal ZFB to lead the command signal ZCMD. The error circuitry is designed to detect the amount of phase shift and initiate counting of the command phase counter in the direction to reduce the error. Each pulse counted into the command phase counter must also be counted into the Z-axis direction counter.

If the Z-axis moves in the negative direction, a negative error will be detected. However, this negative error should not be used to count either the command phase counter or the distance counter. Rather, it will be stored in the reversible counter associated with discriminator. When the error exceeds 1.4 inches, gate 3-16 in FIG. 3 will provide a logic one output indicating that the system is out of synchronization and should be cut off. On the other hand, if a negative error of less than 1.4 inches is stored in the reversible counter and then the Z-axis is moved in the positive direction, the negative error will be reduced toward zero. During this reduction, no change should be made in the command phase counter or in the distance counter. When the error is again in a positive direction, the counters will then be updated to keep in phase with the actual position. When the distance counter reaches zero, new program data may be transferred into the working data storage.

The described functions are effected under control of flip-flop 4-ERROR. The output of the error flip-flop appears on lead 4-30 and has been designated $\overline{ERROR}$. This is a logic zero signal having a duration commensurate with the separation in phase between the command position ZCMD and actual position ZFB signals. It will be apparent to those familiar with this type of control that the error flip-flop may be eliminated under certain circumstances. It has been incorporated for illustrative purposes in view of the fact that the random time spacing of the signal relating to the direction of position error makes it desirable to synchronize the $\overline{ERROR}$ signal with the reference clock pulses before using it in conjunction with the command phase counter and the distance counter.

The error signal is fed in conjunction with two other signals to a gate 4-31. The two other signals are the $\overline{TAPPING}$ signal derived from the Reset output of "Tapping Mode" flip-flop 2-TM and a signal designated DOZ. As will be explained shortly, the latter signal is at logic zero at all times except when the distance counter registers zero. At that time, it changes to a logic one. Gate 4-31 provides a logic one output when it has a full complement of logic zero inputs. Thus, the logic one output is controlled by the duration of the $\overline{ERROR}$ signal. The output of gate 4-31 is applied through gates 4-32 and 4-33 to the command phase counter and distance counter input gates in FIG. 5. The function of the gates 4-32 and 4-33 is to control the application of counting pulses into the command phase counter and distance counter.

It will be recalled from cited U.S. Pat. No. 3,173,001 that the command phase counter 51 is a special counter with a variable counter as a first decade that can be altered in accordance with input pulses in order to adjust the repetition rate of the output extracted therefrom. The particular rate of modification is controlled during contouring operations by signals supplied from the function generator. It is possible to increase the counting rate of the command phase counter or decrease it in accordance with the number of counting pulses supplied. Under the "Tapping Mode," the signals applied to the command phase counter are not those normally provided by the function generator; rather, they are pulses generated in order to modify the counting of the command phase counter in order to keep it in conformity with the actual position of the Z-axis This is in keeping with the fact that rather than having the input data control the command phase counter, it is now necessary to use the position of the Z-axis to control the command phase counter. The specific gating to accomplish this control may now be noted.

The logic zero gating signal $\overline{PCZ}$ from gate 4–32 is applied as one input to gate 5–10. The other input to this gate is the substantially square wave reference signal $\overline{C2}$. As previously noted, the $\overline{C2}$ signal occurs at a repetition rate approximately one-half that of the basic reference pulse generator signal C1 and it is gated through gate 5–10 for the duration of the logic zero condition of signal $\overline{PCZ}$. It will be understood from the aforecited patent that these $\overline{C2}$ pulses are effective to modify the command phase counter in an upward direction. A similar input gating circuit 5–11 is applied to the lower input terminal of the command phase counter. This circuits's inputs include signal +Z indicative of the fact that the positive direction of the Z-axis is programmed.

Distance counter 52 also has counting pulses gated in for the duration dictated by the error between actual position and command position. This is accomplished simply by applying the DCZ signal from gate 4–33 as an enabling signal t the counter so that it will count the $\overline{C2}$ signal. Since the distance counter is preset with the departure required, it will count down the $\overline{C2}$ pulses and provide a logic zero output on lead DOZ when all stages register zero. At this time, the operation has been completed and the next programmed instruction must be consulted.

Having described a specific embodiment of the invention as it is applied to modify a numerical contouring control system in order to tap threads along a Z-axis it will be apparent to those skilled in the art that additional features and modifications may be included in order to perform still further functions. For example, it is believed to be clear that it is not necessary to have separate codes for the left-hand and right-hand threads, rather, standard logic components could be employed to made this determination automatically.

In addition, the distance counter of the threading axis could be used to detect various distances from the programmed end point in order to provide slowdown signals to the spindle in order to prevent overshoot and thereby make possible the tapping of blind holes.

Still further, separate codes can be provided to select various predetermined gear ratios in order to provide the proper thread lead. Still further, this function could be adapted for use in conjunction with normal prearranged program cycles that are provided on positioning and contouring controls.

Although the described threading operation has been adapted to a numerical contouring control apparatus, it could be readily adapted to positioning controls with both absolute and incremental feedback. It is also important to recognize that the principles utilized in conjunction with this invention may also be used for functions other than threadcutting, such as on-machine inspection, or in conjunction with controls where it is necessary to monitor the position of a numerically controlled axis.

It is to be appreciated that whereas the principles of this invention have been made clear by a particular illustrative embodiment, many modifications in structure, arrangement, proportions and elements may be made by those skilled in the art without departing from those principles. The following claims are intended to cover and embrace any of such modifications within the limits only of the true spirit and scope of the invention.

What is claimed and desired to be secured by Letters Patent of the United States is:

1. In a system for controlling the movement of the object with separate drive means:
    first drive means operable to move said object;
    feedback means monitoring movement of said object and providing a feedback signal representative thereof;
    a first source of command pulses;
    a second source of command pulses;
    command means including counters selectively responsive to input data and command pulses to produce a command signal representative of the desired movement of said object;
    control means responsive to said feedback signal and said command signal for controlling said first drive means;
    second drive means operable to move said object;
    first switching means for rendering either said first or said second drive means operative;
    second switching means operable to select the source of command pulses applied to said command means and to modify said command signal in accordance with said feedback signal when said second drive means is operative; and
    means operative in response to predetermined input data to block the reading of subsequent data for a fixed time interval.

2. The system for controlling the relative movement of two objects comprising:
    first and second means operable to effect the motion of the first and second objects, respectively;
    first and second drive means individually operative to cause movement of said object through said first and second means, respectively;
    means for decoupling said first drive means and coupling said second drive means through said first means to cause synchronized movement of both objects; and
    means for controlling said first and second drive means including a source of sequentially programmed data, a first source of pulses, counting means normally responsive to said programmed data and the pulses from said first source to provide the command signal, means coupled to said first object to provide a feedback signal, discriminator means responsive to the difference between said command and feedback signals to control said first drive means and to move said first object to reduce said difference to zero, a second source of pulses, and means controlled by said discriminator means to supply said second source of pulses only to said counting means when said first drive means is decoupled.

3. An arrangement for controlling the movement of an object with separate drive means including:
    first drive means operable to move said object in a first manner;
    feedback means monitoring movement of said object and providing a feedback signal representative thereof;
    command means for providing a command signal representative of the desired movement of said object, said command means including counters selectively responsive to applied pulses to produce said command signal, a source of first command pulses, a source of second command pulses, and means for selectively applying command pulses from one or the other of said sources to said counters to produce said command signal;
    discriminator means responsive to the relative phase of said feedback signal and said command signal for controlling said first drive means;
    second drive means operable to move said object in a second manner; and
    means for rendering said second drive means operative in place of said first drive means.

4. A system according to claim 2 including means for removing control over said first drive means from said discriminator when said first drive means is decoupled.

5. A system according to claim 2 comprising a portion of said counting means being operative in accordance with said input data to stop operation of said second drive means when the position of said first object is substantially as prescribed by said input data.

6. A system according to claim 5, comprising means operative after said counting means stops operation of said second drive means, for controlling further operation of said second drive means until said command signal and said feedback signal are within prescribed limits.

7. An arrangement according to claim 3 further comprising a second object, a source of a second command signal, said second drive means controlling relative movements of said first and second objects in response to said second command signal.